3,269,876
GLASS-COATED STEEL ARTICLE
Carl G. Strobach, Clarendon Hills, Ill., and James S. Roden, Hammond, Ind., assignors to Rheem Manufacturing Company, Chicago, Ill., a corporation of California
No Drawing. Filed Dec. 13, 1962, Ser. No. 244,246
1 Claim. (Cl. 148—6.15)

This invention relates to glass-coated steel and more particularly to a novel coating composition which permits permanently bonding glass or vitreous enamel to steel. Glass formulations having good resistance to hot water and used as linings in water heaters, present difficulty in bonding to the surface of the steel tank because of their high viscosity and low metal content. The high viscosity results from the relatively low alkali content required in the formulations to obtain hot water resistance. Various defects, known as fishscales, copperheads, pinholes, and blisters, form in the glass during the high temperature fusion of this viscous glass to the steel.

It has been proposed comparatively recently to pretreat the steel surface with barium phosphate, nickelous oxide, or mixtures thereof prior to application of the glass. Such treatments have aided in reducing the abovementioned defects in the fused glass but may present difficulties in commercial practice because the coatings themselves do not adhere tenaciously to the steel base metal. These coatings bond only physically to the metal and can be readily brushed off, marred, and scratched. For example, in handling steel tanks during the manufacture of water heaters, some of the coating may be lost. This results in poor bonding of the glass in the uncoated areas. If the tanks stand around for any length of time before application of the glass, the uncoated areas rust. The rust, of course, must be removed and fresh precoat applied before glazing.

It has also been proposed to use zinc phosphate compositions in treating zinc surfaces to promote adhesion of organic protective coatings.

The object of the present invention is to provide a steel precoating composition which will result in a high quality fused glass surface free of fishscales and other defects, and which also chemically combines with the steel surface so that it cannot be peeled, brushed, or knocked off in handling the steel prior to application of the glass. This object is accomplished by applying to a clean steel surface a zinc-nickel phosphate complex from an aqueous solution. Such a solution may be prepared from a mixture of a nickel salt, zinc oxide, phosphoric acid, an oxidizing agent and water. The proportions of nickel ions to zinc ions in the solution should range from 1:2 to 1:9 and preferably 1:3 to 1:4. In a preferred composition nitric acid is used as the oxidizing agent, the presence of which speeds up the deposition of the phosphate coating and its reaction with the iron. The nickel improves the bond and, it is believed, serves as a barrier to hydrogen which migrates to the steel during fusion and causes fishscaling. The zinc and phosphate ions act as wetting and fluxing agents for the glass at the glass-steel interface permitting the glass frit to melt at a lower temperature than the main body of the glass coating, thus minimizing blistering and copper-heading.

The aqueous precoating solution may be applied to the surface of the steel by dipping, spraying, or other suitable means to provide a dried coating having a critical weight ranging from 0.5 to 2.0 grams per square foot. Below 0.5 gram the desired fluxing action is not produced. Above 2.0 grams the precoating is so heavy that it interferes with the bonding. The preferred weight is from 1.4 to 1.8 grams per square foot. The weight of the coating may be increased by increasing the time of contact with the solution, increasing the degree of etch on the steel surface, and increasing the concentration of the nickel-zinc phosphate in the solution.

The oxidizing agents (accelerator for depositing the coating) useful in the compositions of the invention include, in addition to nitric acid, nitrate salts, nitrite salts, hydrogen peroxide and perchlorates.

The precoating solution is applied to the clean surface of the steel which has previously been pickled, sandblasted, or grit blasted. The temperature of the solution is maintained at 160° to 170° Fahrenheit. The precoated steel part is then rinsed and dried as in a warm air oven. The coating deposited is adherent, dark gray in color, and finely textured. The glass formulation is then applied by spraying or the like, and the coated steel is fired at the fusion temperature for the glass. The presence of the precoat eliminates fishscales, copperheads, pinholes, etc., in the fused glass on the steel, and increases the adhesion of the glass to the steel.

The glass formulations used in conjunction with the precoating composition of the invention are those having a low alkali content to provide the best possible resistance to high temperature water. Such compositions are well known in the art and preferably contain a major proportion of silica in combination with several metal oxides such as the oxides of sodium, calcium, aluminum, boron, and titanium. The precoating compositions of the invention are operable with glass formulations other than these, but the importance of the present compositions lies in their use with the insoluble formulations which cause bonding difficulty.

*Example 1*

A concentrated precoating solution was prepared having the following composition:

Zinc oxide _____ grams__ 184
Nickel sulfate _____ do____ 170
Nitric acid, 42° Baumé _____ cubic centimeters__ 37
Phosphoric acid, 75% _____ do____ 500
Water, to make 1000 cubic centimeters.

The zinc oxide and nickel sulfate were suspended in approximately 300 cubic centimeters of water. The phosporic acid was added slowly to the suspension with constant agitation. The nitric acid was added after the zinc oxide and nickel sulfate were dissolved. This concentrated solution was mixed with water in a quantity of approximately 8½% to provide a dipping bath. The temperature of the bath was maintained at 160° to 170° Fahrenheit.

The solution had a total acid content of 85 to 95 (number of cubic centimeters of N/10 NaOH required to neutralize a 10 cubic centimeter sample of the solution to a phenothalein end point). The solution had a free acid content of from 15–17 (number of cubic centimeters of N/10 NaOH required to neutralize a 10 cubic centimeter sample of the solution to a brom phenol blue end point). The ratio of total acid to free acid should be between 5 and 7 to 1 to obtain a good adhesive coating.

An S.A.E. 1010 steel plate having a thickness of 0.086" was grit blasted. After blasting the plate was rinsed in water and immersed for five minutes in the precoating solution described above. The plate was then removed, rinsed with water and forced air dried. The dried plate had a coating weight equivalent to 1.8 grams per square foot. A glass conventionally used for lining water tanks was applied to the precoat by spraying.

The glass coating was then fired at a temperature of 1580° Fahrenheit for a period of 8 minutes to fuse the glass to the steel. The resulting glass coated steel was free of fishscales, copperheads, blisters, and the like, and the glass had excellent adherence to the steel.

Example II

A precoating solution was prepared having the following composition:

Nickel sulfate _____ grams__ 15
Zinc oxide _____ do____ 10
Phosphoric acid, 75% _____ cubic centimeters__ 25
Nitric acid _____ do____ 2.5
Water, to make 1000 cubic centimeters.

This solution was sprayed on a sheet of steel in an amount sufficient to provide a dried coating of about 0.55 gram per square foot. The precoated steel sheet was then glass coated in accordance with the procedure set forth in Example I. Excellent adhesion was obtained and no defects in the surface were observed.

Example III

A concentrated precoating solution was prepared, utilizing the following formulation:

Zinc oxide _____ grams__ 184
Nickel chloride _____ do____ 160
Nitric acid, 42° Baumé _____ cubic centimeters__ 37
Phosphoric acid, 75% _____ do____ 500
Water, to make 1000 cubic centimeters.

This solution was prepared as the one described in Example I and a low alkali glass was applied and fused. The results were observed and found to be identical to those obtained using the precoating solution of Example I.

We claim:

A glass-coated steel base having an intermediate bonding coat comprising a zinc-nickel phosphate chemically combined with the steel and a surface coating of a low-alkali glass fused thereto.

References Cited by the Examiner
UNITED STATES PATENTS

| | | | |
|---|---|---|---|
| 2,076,869 | 4/1937 | Tanner. | |
| 2,121,574 | 6/1938 | Romig | 148—6.15 |
| 2,296,844 | 9/1942 | Glasson | 148—6.15 |
| 2,540,314 | 2/1951 | Amundsen | 148—6.15 |
| 2,591,479 | 4/1952 | Ward | 148—6.15 |
| 2,809,907 | 10/1957 | Cramer | 148—6.15 |
| 2,813,812 | 11/1957 | Somers et al. | 148—6.15 |
| 2,835,617 | 5/1958 | Mauer | 148—6.15 |
| 3,082,116 | 3/1963 | Halversen et al. | 117—53 X |
| 3,090,709 | 5/1963 | Henricks | 148—6.15 |
| 3,109,757 | 11/1963 | Reinhold | 148—6.15 |

FOREIGN PATENTS

| | | |
|---|---|---|
| 731,882 | 6/1955 | Great Britain. |
| 755,559 | 8/1956 | Great Britain. |
| 757,050 | 9/1956 | Great Britain. |

OTHER REFERENCES

Burns and Bradley, Protective Coatings for Metals, Reinhold Publishing Corporation, 2nd Ed., 1955, pp. 549–551, TA 462 B 85.

ALFRED L. LEAVITT, *Primary Examiner.*

R. S. KENDALL, MURRAY KATZ, *Examiners.*